Aug. 12, 1969  L. E. DREHMAN  3,461,182
PRODUCTION OF HIGH PURITY CYCLOHEXANE
Filed May 1, 1967
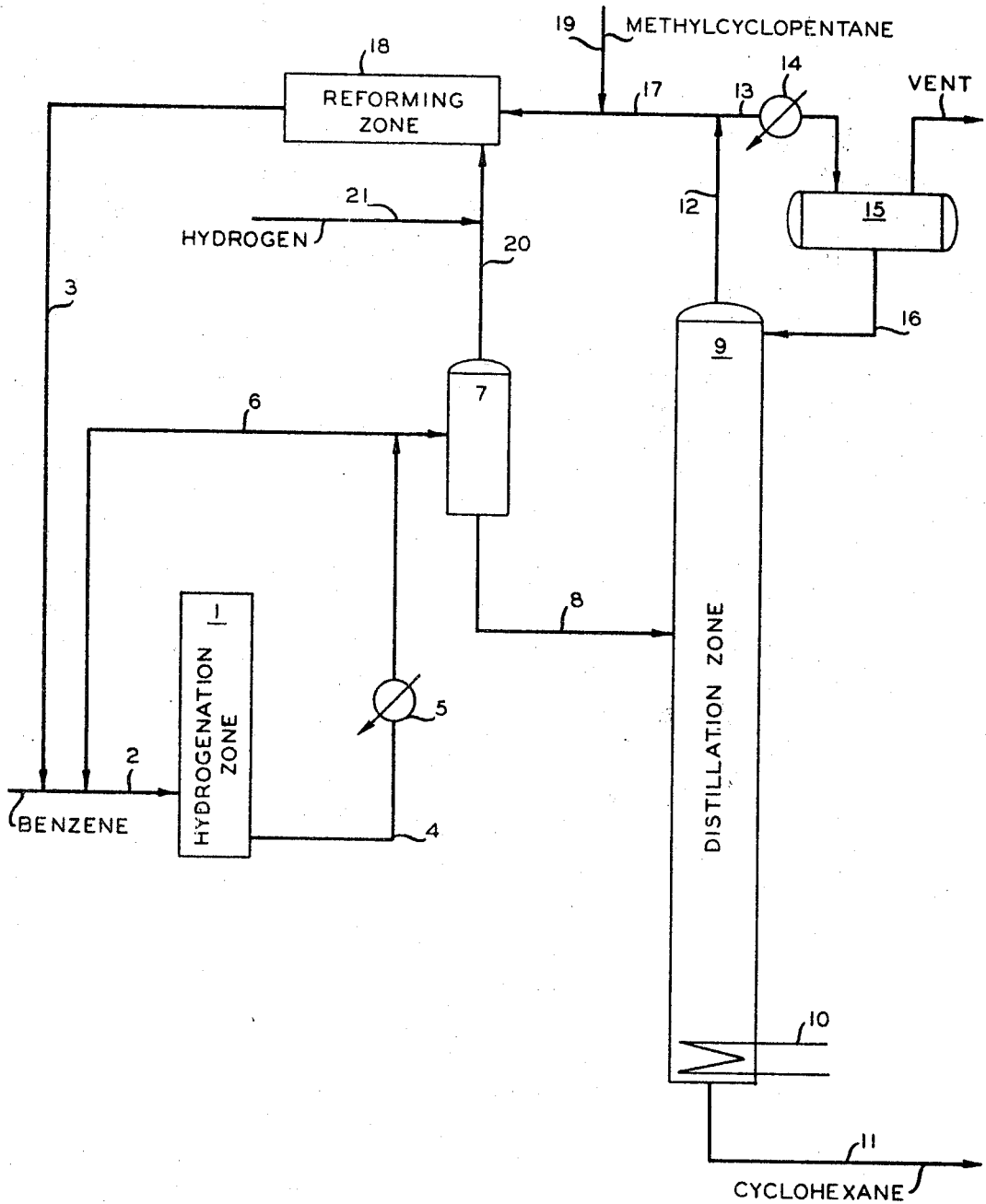
INVENTOR.
L. E. DREHMAN
BY
*Young & Quigg*
ATTORNEYS

United States Patent Office 3,461,182
Patented Aug. 12, 1969

3,461,182
PRODUCTION OF HIGH PURITY CYCLOHEXANE
Lewis E. Drehman, Bartlesville, Okla., assignor to Phillips
Petroleum Company, a corporation of Delaware
Filed May 1, 1967, Ser. No. 634,952
Int. Cl. C07c 5/10, 5/14
U.S. Cl. 260—667                             5 Claims

ABSTRACT OF THE DISCLOSURE

Benzene is separated from a mixture containing cyclohexane by distilling the mixture in the presence of methylcyclopentane. Also, an integral process whereby benzene is hydrogenated to cyclohexane in the presence of methylcyclopentane which forms an azeotrope with benzene in the hydrogenation effluent and benzene is separated from cyclohexane by distillation. Additional methylcyclopentane is added to the azeotrope passing overhead from the distillation step, the combined stream is reformed to convert the methylcyclopentane therein to benzene and the reformate is recycled to the hydrogenation step.

---

This invention relates to the production of high purity cyclohexane. In one of its aspects, this invention relates to an improved hydrogenation process for producing high purity cyclohexane from a benzene stream.

Large quantities of cyclohexane are used in the production of certain synthetic fibers and as solvents in many processes. The present demand for cyclohexane has exceeded the quantity recoverable from cyclohexane-containing hydrocarbon streams by separation means. Therefore, manufacturers have resorted to methods of synthesizing cyclohexane from other hydrocarbons.

One of the more economical methods for synthesizing cyclohexane from other hydrocarbons is the hydrogenation of a benzene stream. This method produces a somewhat impure cyclohexane product since the hydrogenation reaction in most instances leaves some residual benzene in the effluent. Ever-increasing demands for high purity cyclohexane require that manufacturers constantly strive to improve the purity of the synthesized cyclohexane product. When benzene is present with the cyclohexane, the manufacturer is faced with a difficult separation problem due to the closeness of the boiling points of benzene and cyclohexane which eliminates the use of the more common separation operations, such as fractional distillation.

The separation of cyclohexanes and benzene by azeotropic distillation is disclosed in U.S. Patent No. 3,257,292, issued to J. T. Cabbage, June 21, 1966. This patent discloses a process for converting a benzene feed stream to cyclohexane by catalytic hydrogenation in the presence of normal hexane and the separation of benzene and cyclohexane by azeotropic distillation. The normal hexane acts as a separation agent and forms an azeotrope with the benzene so that a satisfactory separation can be accomplished by distillation. The benzene azeotrope, comprising primarily normal hexane with a small quanity of benzene, is passed overhead from the distillation step and recycled to the hydrogenation step.

I have found that benzene can be separated from cyclohexane by using methylcyclopentane, or a narrow boiling range fraction of natural gasoline comprising primarily methylcyclopentane, instead of n-hexane as the separating agent. The mol percent of benzene in the azeotrope formed with methylcyclopentane is approximately ten times that in a n-hexane azeotrope. This increased effectivenes of the methylcyclopentane to form an azeotrope with benzene reduces the quantity of the separating agent necessary to obtain a high purity cyclohexane product from the distillation. This reduction in the quantity of separating agent required has the advantage of permitting the use of smaller, and therefore less expensive, distillation equipment to accomplish the same separation.

In addition, an integral process which utilizes a commonly available refinery stream to produce at least a portion of the benzene and hydrogen feed requirements to the hydrogenation zone will reduce operating costs.

Accordingly, an object of this invention is to provide an improved process for producing high purity cyclohexane.

Another object of this invention is to provide an improved process for producing high purity cyclohexane from benzene.

A further object is to provide an improved method to obtain an effective separation of benzene from cyclohexane by azeotropic distillation.

A still further object of this invention is to provide an integral process for producing high purity cyclohexane by hydrogenation of benzene and separating the hydrogenation reaction effluent by azeotropic distillation wherein the benzene and hydrogen feed requirements are minimized.

Other aspects, objects, and advantages of the invention will become apparent to those skilled in the art from the following detailed description, drawing, and appended claims.

According to this invention, a process is provided whereby a substantially pure benzene stream is converted to cyclohexane by catalytic hydrogenation in the presence of methylcyclopentane, which is inert to the hydrogenation catalyst; the cyclohexane and benzene contained in the hydrogenation reaction effluent are separated by azeotropic distillation, the methylcyclopentane acting as a separating agent and forming an azeotrope with the benzene; the cyclohexane is removed as a bottom product of the distillation and the vaporous benzene-methylcyclopentane azeotrope is passed overhead.

Further, in accordance with this invention the methylcyclopentane-benzene azeotrope passing overhead from the distillation step is catalytically reformed in the presence of hydrogen, after being combined with additional methylcyclopentane, to produce an effluent containing primarily benzene, hydrogen, and methylcyclopentane, with small amounts of cyclohexane; and the reformate is recycled to the hydrogenation step. This integral process with the reforming step produces a high purity cyclohexane with reduced benzene and hydrogen feed requirements.

The hydrogenation reaction is carried out by contacting the benzene feed, as vapor phase, with the hydrogenation catalyst in hydrogen under suitable conditions of elevated temperatures, usually between about 380 to 500° F. Pressure will be dependent on the operating temperature as well as the hydrogen to hydrocarbon mol ratio, and is usually about 300 to 500 p.s.i.g. The liquid hourly space velocity is between about 0.5 and 10 cubic feet of liquid per cubic foot of catalyst per hour. Operation with an excess of hydrogen is preferred, the hydrogen-to-hydrocarbon mol ratio being about 2:1 to about 20:1, preferably about 5:1 to 12:1. This reaction is generally conducted in a fixed bed catalyst zone; however, moving bed and fluidized bed catalyst zones can be employed.

Any catalyst suitable for hydrogenation is applicable to this invention. Examples of such catalysts include nickel, platinum, tungsten, and molybdenum. These materials are generally finely divided and are on a porous support such as precipitated alumina, alumina-silica coprecipitate or kieselguhr containing in the range of 25 to 60 weight percent nickel.

Methylcyclopentane is introduced along with benzene into the hydrogenation zone. The use of methylcyclopentane, which is inert to the hydrogenation catalyst in this reaction, improves the benzene hydrogenation operation by absorbing some of the heat of reaction.

The hydrogenation reaction effluent, containing substantially cyclohexane with minor amounts of benzene and methylcyclopentane is purified in a distillation zone. The distillation zone can be operated at a top temperature of about 250° F. and at a pressure of about 60 p.s.i.g. However, other temperature-pressure conditions can be used as will be recognized by those skilled in the art. The distillation produces pure cyclohexane bottoms product and an overhead essentially of benzene and methylcyclopentane. The methylcyclopentane present in the feed to the distillation zone acts as a separating agent and forms an azeotrope with the benzene. The methylcyclopentane so alters the volatilities of benzene and cyclohexane that satisfactory separation can be accomplished in the distillation zone. The mol ratio of methylcyclopentane to benzene in the feed to the distillation zone should be 6.15:1 or more, preferably in the range of 7:1 to 20:1, to obtain the desired purity of the cyclohexane product.

The benzene-methylcyclopentane azeotrope stream passing overhead from the distillation zone, after additional methylcyclopentane has been combined therewith, is reformed in the presence of excess hydrogen to convert the methylcyclopentane to benzene and cyclohexane. The reforming is carried out by contacting the methylcyclopentane-containing stream, as vapor phase, with a catalyst. Any suitable catalyst, such as platinum-alumina, can be used. A pressure of 0 to 1000 p.s.i.g., preferably 150 to 600 p.s.i.g., and a temperature of about 700 to 1000° F., preferably 800 to 950° F., can be used. The liquid hourly space velocity can be about 0.5 to 10 cubic feet of liquid feed per cubic foot of catalyst per hour, 1 to 5 being preferred. The hydrogen-to-hydrocarbon mol ratio is usually about 0.5:1 to 20:1, preferably 2:1 to 10:1. This reforming results primarily in conversion of methylcyclopentane to benzene and hydrogen. The reforming effluent is recycled to the hydrogenation zone thereby reducing the benzene and hydrogen feed requirements.

This invention will now be described more fully with reference to the drawing which shows a schematic flow diagram of a specific embodiment representative of the invention.

A stream comprising 3,186 mols per day of benzene (with a purity of 99+volume percent) is introduced into hydrogenation zone 1 through conduit 2. A recycle stream comprising 1,797 mols per day of benzene, 26,489 mols per day of hydrogen, 98 mols per day of methylcyclopentane and 31 mols per day of cyclohexane is introduced into conduit 2 through conduit 3. In hydrogenation zone 1 the feed contacts a fixed bed of nickel on kieselguhr catalyst at an average temperature of 450° F., a pressure of 435 p.s.i.g. and a liquid hourly space velocity of 2 (measured as cubic feet of liquid per cubic foot of catalyst per hour) and the benzene is converted to cyclohexane. A stream, containing primarily cyclohexane and free hydrogen with small amounts of benzene and the unreacted methylcyclopentane, is withdrawn from hydrogenation zone 1 through conduit 4 and passed to cooler 5. If desired, a portion of the stream which has been cooled can be recycled through conduit 6 to conduit 2 to absorb some of the heat of reaction in hydrogenation zone 1. The remainder of the stream is passed to knockout drum 7 wherein hydrogen is removed. A stream comprising 5,000 mols per day cyclohexane, 98 mols per day methylcyclopentane, and 14 mols per day benzene (methylcyclopentane to benzene mol ratio of 7:1) is introduced into distillation zone 9 through conduit 8.

Heat is added to distillation zone 9 by reboiler 10. Distillation zone 9 is operated at a top temperature of about 250° F. and a pressure of about 60 p.s.i.g. The benzene-methylcyclopentane azeotrope is separated from cyclohexane in distillation zone 9. A stream comprising 5,000 mols per day of substantially pure (25 parts per million benzene) liquid cyclohexane is withdrawn from distillation zone 9 through conduit 11. Vapors, comprising primarily methylcyclopentane and benzene, pass overhead from distillation zone 9 through conduit 12.

A portion of the overhead vapors are passed through conduit 13, to condenser 14. The liquid from this condenser is introduced into accumulator 15. Liquid in accumulator 15 is recycled to distillation zone 9 as reflux through conduit 16. The remaining overhead vapors, comprising 98 mols per day methylcyclopentane and 14 mols per day benzene, are passed to reforming zone 18 through conduit 17. A stream comprising 1,814 mols per day methylcyclopentane is added to conduit 17 through conduit 19. Substantially pure methylcyclopentane or a narrow boiling-point range fraction of natural gasoline comprising primarily methylcyclopentane can be used. The latter source is preferred because it is a commonly available refinery stream thereby making the overall process more economical.

A stream, comprising 11,540 mols per day hydrogen, from knockout drum 7 is passed through conduit 20 to reforming zone 18. To maintain the mol ratio of hydrogen-to-hydrocarbon within reforming zone 18 at about 11:1, 9,600 mols per day hydrogen is introduced into conduit 20 through conduit 21. In reforming zone 18, methylcyclopentane is converted to benzene, cyclohexane, and hydrogen. Reaction effluent from reforming zone 18, comprising 1,797 mols per day benzene, 26,489 mols per day hydrogen, 98 mols per day methylcyclopentane, and 31 mols per day cyclohexane, is recycled through conduit 3 to conduit 2 and subsequently into hydrogenation zone 1.

Various valves, pumps, heaters, etc., required for process control which will be apparent to those skilled in the art have been omitted for the purposes of brevity.

As is apparent from this description, a substantial reduction in benzene feed and hydrogen requirements from an external source is realized with the process of this invention. The process of the above-identified patent requires 5,000 mols per day benzene feed and 15,000 mols per day hydrogen from an external source to produce 5,000 mols per day cyclohexane. The process of this invention, by reforming methylcyclopentane, which can be obtained from a commonly available refinery stream, in the presence of hydrogen separated from the hydrogenation effluent, requires only 3,186 mols per day benzene feed and 9,600 mols per day hydrogen from an external source to produce 5,000 mols per day cyclohexane.

Tests were performed to determine the effectiveness of methylcyclopentane to form an azeotrope with benzene in the presence of cyclohexane. Surprisingly it was found that a minimum of 86 mols of methlcyclopentane can be used to form an azeotrope for the separation of the 14 mols of benzene from the cyclohexane in stream 8 while a minimum of 860 mols of n-hexane is required. From this it can be seen that methylcyclopentane is much more effective in separating benzene from cyclohexane than is n-hexane.

Reasonable variations and modifications are possible within the scope of this invention without departing from the scope and spirit thereof.

I claim:

1. In a process for producing cyclohexane from a benzene feed stream by catalytically hydrogenating said benzene and separating cyclohexane from benzene in the hydrogenation effluent by azeotropic distillation, the improvement comprising distilling said effluent with methylcyclopentane to form an azeotrope with the benzene contained therein, removing cyclohexane as a bottom product of said distillation, passing said azeotrope overhead from said distillation, reforming said overhead to produce a reformate containing primarily benzene, hydrogen, methylcyclopentane and cyclohexane, and recycling said reformate to the hydrogenation zone.

2. The process according to claim 1 wherein the mol ratio of methylcyclopentane to benzene fed to said distillation step is at least 6.15:1.

3. The process according to claim 1 wherein the mol ratio of methylcyclopentane to benzene fed to said distillation step is in the range of 7:1 to 20:1.

4. The process according to claim 3 wherein additional methylcyclopentane is combined with said overhead prior to said reforming.

5. In a process for producing cyclohexane from a benzene feed stream by catalytically hydrogenating said benzene and separating cyclohexane from benzene in the hydrogenation effluent by azeotropic distillation, the improvement comprising separating hydrogen from said effluent; distilling said effluent with methylcyclopentane to form an azeotrope with benzene contained therein, the mol ratio of methylcyclopentane to benzene fed to said distillation step being in the range of 7:1 to 20:1; removing cyclohexane as a bottoms product of said distillation; passing said azeotrope overhead from said distillation; introducing additional methylcyclopentane into said overhead; passing said overhead combined with said additional methylcyclopentane to a reforming zone wherein a reformate containing primarily benzene, hydrogen, methylcyclopentane and cyclohexane is produced; passing said separated hydrogen combined with additional hydrogen to said reforming zone; and recycling said reformate from said reforming zone to said benzene stream.

References Cited

UNITED STATES PATENTS

| | | | |
|---|---|---|---|
| 2,440,414 | 4/1948 | Oblad | 260—667 |
| 2,373,673 | 4/1945 | Fuller et al. | 260—667 |
| 3,257,292 | 6/1966 | Cabbage | 260—667 |
| 2,493,567 | 1/1950 | Birch | 260—667 |

DELBERT E. GANTZ, Primary Examiner

V. O. KEEFE, Assistant Examiner